US012679943B2

(12) United States Patent
Buono et al.

(10) Patent No.: US 12,679,943 B2
(45) Date of Patent: Jul. 14, 2026

(54) ADDITIVE FOR REDUCING POLYURETHANE FOAM DEGRADATION

(71) Applicant: Huntsman International LLC, The Woodlands, TX (US)

(72) Inventors: Pietro Buono, Everberg (BE); Dion Deriks, Everberg (BE); Wouter Geers, Everberg (BE); Heiko Heinrich Humbert, Everberg (BE); Geert Lodewijk Dries, Everberg (DE); Petra Emma Vanderstraeten, Everberg (BE)

(73) Assignee: HUNTSMAN INTERNATIONAL LLC

( * ) Notice: Subject to any disclaimer, the term of this patent is extended or adjusted under 35 U.S.C. 154(b) by 509 days.

(21) Appl. No.: 18/020,305

(22) PCT Filed: Aug. 11, 2021

(86) PCT No.: PCT/EP2021/072419

§ 371 (c)(1),
(2) Date: Feb. 8, 2023

(87) PCT Pub. No.: WO2022/034151

PCT Pub. Date: Feb. 17, 2022

(65) Prior Publication Data

US 2023/0303792 A1 Sep. 28, 2023

(30) Foreign Application Priority Data

Aug. 14, 2020 (EP) .................................... 20191153

(51) Int. Cl.

| | |
|---|---|
| ***C08G 18/08*** | (2006.01) |
| ***C08G 18/20*** | (2006.01) |
| ***C08G 18/30*** | (2006.01) |
| ***C08G 18/32*** | (2006.01) |
| ***C08G 18/48*** | (2006.01) |
| ***C08G 18/75*** | (2006.01) |
| ***C08G 18/76*** | (2006.01) |
| ***C08G 77/46*** | (2006.01) |
| ***C08J 9/00*** | (2006.01) |
| ***C08K 5/42*** | (2006.01) |
| ***C08K 5/46*** | (2006.01) |
| ***C08K 5/54*** | (2006.01) |

(52) U.S. Cl.
CPC ........ *C08J 9/0033* (2013.01); *C08G 18/0838* (2013.01); *C08G 18/14* (2013.01); *C08G 18/2063* (2013.01); *C08G 18/4812* (2013.01); *C08G 18/758* (2013.01); *C08K 5/42* (2013.01); *C08K 5/46* (2013.01); *C08J 2375/08* (2013.01)

(58) Field of Classification Search
CPC ......... C08G 8/1825; C08J 9/0033; C08K 5/42
See application file for complete search history.

(56) References Cited

U.S. PATENT DOCUMENTS

| | | | | |
|---|---|---|---|---|
| 3,892,685 | A | 7/1975 | Pusey | |
| 5,420,170 | A | 5/1995 | Lutter et al. | |
| 5,648,447 | A | 7/1997 | Seneker et al. | |
| 6,107,359 | A | 8/2000 | Dietrich et al. | |
| 6,552,100 | B2 | 4/2003 | McLaren et al. | |
| 6,737,471 | B2 | 5/2004 | Lorenz et al. | |
| 6,790,872 | B2 | 9/2004 | Kazmierski et al. | |
| 2017/0210847 | A1 * | 7/2017 | Okiyama | C08G 18/76 |
| 2018/0273674 | A1 | 9/2018 | Klesczewski et al. | |

FOREIGN PATENT DOCUMENTS

| | | | | |
|---|---|---|---|---|
| EP | 1048677 | A1 * | 11/2000 | C08G 18/1825 |
| EP | 3612581 | A1 | 2/2020 | |
| GB | 1211405 | A | 11/1970 | |
| JP | 02163160 | A | 6/1990 | |
| JP | 2016147820 | A | 8/2016 | |
| WO | WO-2017009310 | A1 * | 1/2017 | C09J 175/06 |

OTHER PUBLICATIONS

"Dow Polyurethanes Flexible Foams" by Herrington et al. at pp. D.1-D.23 (1997).
Office Action issued Dec. 16, 2025, in corresponding Chinese Application No. 202180055558.8 (machine English translation enclosed herewith).

* cited by examiner

*Primary Examiner* — Melissa A Rioja

(57) ABSTRACT

The present disclosure relates to sulfonic acid esters for use as additives in a polyurethane formulation. The polyurethane formulation further includes a compound containing an isocyanate functional group, an active hydrogen-containing compound and a reactive amine catalyst.

15 Claims, No Drawings

ADDITIVE FOR REDUCING POLYURETHANE FOAM DEGRADATION

CROSS-REFERENCE TO RELATED APPLICATIONS

This application is the National Phase of International Application PCT/EP2021/072419 filed Aug. 11, 2021 which designated the U.S. and which claims priority to European App. Serial No. 20191153.4 filed Aug. 14, 2020. The noted applications are incorporated herein by reference.

FIELD

The present disclosure generally relates to an additive for use in improving the mechanical properties of polyurethane materials, including polyurethane foams. In particular, the present disclosure relates to the use of an organic sulfur-based compound as an additive to significantly reduce the deterioration of mechanical properties and minimize the emissions of volatile compounds from polyurethane foam under heat, high humidity or heat-high humidity conditions.

BACKGROUND

Polyurethane foam is widely known and used in a variety of applications, such as in the automotive industry. In automotive applications, these materials are used, for example, in automotive exterior cladding as spoilers, roof elements, spring elements and in automotive interior cladding as roof claddings, door linings, cable insulation, steering wheels, buttons and seat pads.

Excellent mechanical properties are required from these polyurethane foams, and such properties ideally should not change over the life of the automobile. For instance, the polyurethane foams should retain their cushioning, noise damping and haptic properties and also perform security-related tasks, such as damping mechanical impacts in the event of an accident.

Significant change in temperature—for example, from −10° C. up to 60° C.—can occur inside the automobiles thereby accelerating the aging and mechanical degradation of polyurethane foams. Furthermore, the relative air humidity can be up to 100%, further contributing to the aging process. For these reasons, it is also necessary that polyurethane foams used in the interior of the automobile release the lowest possible emissions of volatile compounds. In order to reduce emissions, isocyanate-reactive catalyst solutions have been developed by polyurethane formulators; however, these catalysts can lead to a further deterioration of the mechanical properties of the polyurethane foam during heat or wet-heat storage conditions.

Thus, there is a continuing need for the development of new additives which can reduce the deterioration of the mechanical properties of rigid, semi-rigid or flexible polyurethane foam (as compared to current additives) and also minimize the emissions of volatile compounds from such polyurethane foam, under heat or high humidity-heat conditions.

SUMMARY

The present disclosure provides a polyurethane formulation comprising a compound containing an isocyanate functional group, an active hydrogen-containing compound, an isocyanate-reactive amine catalyst and a sulfonic acid ester wherein the molar ratio of the number of moles of tertiary amine groups present in isocyanate reactive amine catalysts (d) over the number of moles of sulfonic acid ester compounds (a) in the formulation is higher or equal than 2, preferably in the range 2-5, more preferably in the range 2-4 and most preferably in the range 2-3 in order to achieve a polyurethane foam material having improved mechanical properties and minimal emissions of volatile compounds under heat or wet-heat conditions.

In yet another embodiment, there is provided a method of forming a polyurethane material comprising combining and/or reacting the compound containing an isocyanate functional group, the active hydrogen-containing compound and optional auxiliary components in the presence of the reactive amine catalyst and the sulfonic acid ester.

DETAILED DESCRIPTION

The following terms shall have the following meanings:

The term “comprising” and derivatives thereof are not intended to exclude the presence of any additional component, step or procedure, whether or not the same is disclosed herein. In order to avoid any doubt, all compositions claimed herein through use of the term “comprising” may include any additional additive or compound, unless stated to the contrary. In contrast, the term, “consisting essentially of” if appearing herein, excludes from the scope of any succeeding recitation any other component, step or procedure, except those that are not essential to operability and the term “consisting of”, if used, excludes any component, step or procedure not specifically delineated or listed. The term “or”, unless stated otherwise, refers to the listed members individually as well as in any combination.

The articles “a” and “an” are used herein to refer to one or to more than one (i.e. to at least one) of the grammatical objects of the article. By way of example, “a sulfonic acid ester” means one sulfonic acid ester or more than one sulfonic acid ester. The phrases “in one embodiment”, “according to one embodiment” and the like generally mean the particular feature, structure, or characteristic following the phrase is included in at least one embodiment of the present disclosure, and may be included in more than one embodiment of the present disclosure. Importantly, such phrases do not necessarily refer to the same aspect. If the specification states a component or feature “may”, “can”, “could”, or “might” be included or have a characteristic, that particular component or feature is not required to be included or have the characteristic.

The term “about” as used herein can allow for a degree of variability in a value or range, for example, it may be within 10%, within 5%, or within 1% of a stated value or of a stated limit of a range.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

The terms “preferred” and “preferably” refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the present disclosure.

Where substituent groups are specified by their conventional chemical formula, written from left to right, they equally encompass the chemically identical substituents that would result from writing the structure from right to left, for example, —$CH_2O$— is equivalent to —$OCH_2$—.

The term “alkyl group” is inclusive of both straight chain and branched chain, saturated or unsaturated, alkyl groups. Such alkyl groups may have up to 20 carbon atoms unless otherwise specified. In some embodiments, alkyl groups may be lower alkyl groups. The term “lower” refers to alkyl groups having from 1 to 5 carbon atoms. Examples of “lower alkyl groups” include, but are not limited to, methyl, ethyl, n-propyl, i-propyl, butyl, and pentyl groups.

The term “optional” or “optionally” means that the subsequently described event or circumstance may or may not occur, and that the description includes instances where said event or circumstance occurs and instances where it does not.

The term “polyurethane”, as used herein, is understood to encompass pure polyurethane, polyurethane polyurea, and pure polyurea.

The term “polyurethane material(s)”, as used herein, include rigid foams, flexible foams, semi-rigid foams, integral foams, microcellular elastomers, cast elastomeric foams, polyurethane-isocyanurate foams, reaction injection molded polymers, structural reaction injection molded polymers and the like.

The present disclosure is generally directed to sulfonic acid esters and their use in polyurethane formulations which may include a compound containing an isocyanate functional group, an active hydrogen-containing compound and a reactive amine catalyst containing at least one tertiary amine group. By “reactive” catalyst we mean a catalyst which possesses chemical reactive groups towards isocyanates (e.g. —OH, —$NH_2$, —NH), also referred to as “isocyanate-reactive”. A catalyst with such characteristics at the end of the foams production process becomes part of the polymeric structure of the foams. In comparison, a “non-reactive” catalyst does not possess chemical reactive groups towards isocyanates, therefore at the end of the foams production process it remains as free chemical species.

The present disclosure is also directed to polyurethane materials, specifically polyurethane foams (including, for example, rigid, semi-rigid or flexible polyurethane foam), made from a polyurethane formulation comprising a sulfonic acid ester as described herein, a compound containing an isocyanate functional group, an active hydrogen-containing compound and a reactive amine catalyst containing at least one tertiary amine group.

It has been surprisingly found that combining the sulfonic acid ester according to the present disclosure with the reactive catalyst leads to a polyurethane material having improved mechanical properties and minimal emissions of volatile compounds under heat or wet-heat conditions. The goal is to improve mechanical properties of the foam by reducing and/or avoiding foam degradation under humid aging conditions while keeping the foams emissions comparable to a reference foam produced without sulfonic acid esters. This is achieved by the current invention by combining specific additives selected from sulfonic acid ester compounds with isocyanate reactive amine catalyst compounds in specific ratios in the reactive formulation for making the polyurethane foam.

According to one embodiment, the sulfonic acid ester is selected from: (i) a compound having a formula (1)

(1)

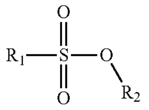

where $R_1$ is a $C_1$-$C_{18}$ alkyl group with one or more hydroxyl groups or a $C_1$-$C_{18}$ alkoxy group with one or more hydroxyl groups and $R_2$ is a methyl group, a $C_1$-$C_{18}$ alkyl group with one or more hydroxyl groups or a $C_1$-$C_{18}$ alkoxy group with one or more hydroxyl groups; (ii) a compound having a formula (2)

(2)

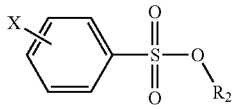

where X is hydrogen or an ortho, meta or para substituent selected from a $C_1$-$C_{18}$ alkyl group which may be substituted with one or more hydroxyl groups or a $C_1$-$C_{18}$ alkoxy group which may be substituted with one or more hydroxyl groups and $R_2$ is a methyl group, a $C_1$-$C_{18}$ alkyl with one or more hydroxyl groups or a $C_1$-$C_{18}$ alkoxy group with one or more hydroxyl groups; (iii) a compound having the formula (3)

(3)

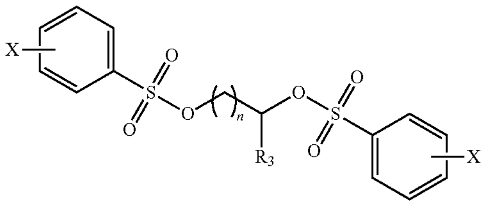

where each X is independently hydrogen or an ortho, meta or para substituent selected from a $C_1$-$C_{18}$ alkyl group which may be substituted with one or more hydroxyl groups or a $C_1$-$C_{18}$ alkoxy group which may be substituted with one or more hydroxyl groups, n is an integer from 1 to 8 and $R_3$ is H or a $C_1$-$C_4$ alkyl group which may be substituted with one or more hydroxyl groups; (iv) a compound having a formula (4)

(4)

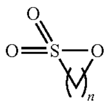

where n is an integer from 1 to 5; (v) a compound having the formula (5)

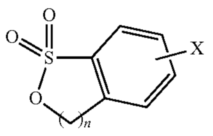

(5)

where n is an integer from 0 to 3 and X is hydrogen or an ortho, meta or para substituent selected from a $C_1$-$C_{18}$ alkyl group which may be substituted with one or more hydroxyl groups or a $C_1$-$C_{18}$ alkoxy group which may be substituted with one or more hydroxyl groups; and (vi) a mixture thereof.

According to one embodiment, the $R_1$ and $R_2$ alkyl groups include, but are not limited to, lower alkyl groups such as methyl, ethyl and n-propyl. In another embodiment, each X may independently include, but are not limited to, hydrogen, methyl, ethyl, n-propyl, iso-propyl, propyl or butyl and in other embodiments are positioned at the para position.

Particular compounds that may be used as the sulfonic acid ester include, but are not limited to, methyl p-toluene sulfonate, cyclohexyl o-toluene sulfonate, isopropyl benzene sulfonate, ethyl chlorobenzene sulfonate, methyl benzene sulfonate, ethyl benzene sulfonate, butylbenzene sulfonate, ethylene bis(benzene sulfonate), ethylene di(p-toluene-sulfonate) and variants thereof. For example the variants of sulfonic acid ester compounds selected from methyl benzene sulfonate include compounds such as 2-(2-hydroxyethoxy)ethyl 4-methylbenzenesulfonate (see below structure 2a)

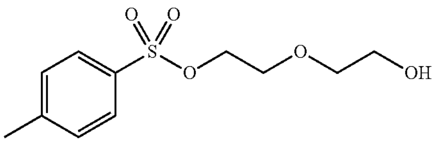

(2a)

In one embodiment, the polyurethane formulation may contain at least about 0.1% by weight, based on the total weight of the polyurethane formulation, of the sulfonic acid ester. In other embodiments, the polyurethane formulation may contain at least about 0.2% by weight, or at least about 0.5% by weight, or at least about 0.7% by weight of the sulfonic acid ester, based on the total weight of the polyurethane formulation. In further embodiments, the polyurethane formulation may contain no more than about 3% by weight, based on the total weight of the polyurethane formulation, of the sulfonic acid ester. In other embodiments, the polyurethane formulation may contain no more than about 2.5% by weight, or no more than about 2% by weight, or no more than about 1.5% by weight of the sulfonic acid ester, based on the total weight of the polyurethane formulation.

According to some embodiments, the sulfonic acid esters above are combined with an isocyanate-reactive amine catalyst such that the molar ratio of the number of moles of tertiary amine groups present in isocyanate reactive amine catalysts (d) over the number of moles of sulfonic acid ester compounds (a) in the formulation is higher or equal than 2, preferably in the range 2-5, more preferably in the range 2-4 and most preferably in the range 2-3.

According to some embodiments, the isocyanate-reactive amine catalyst is containing at least one tertiary amine group having a general formula (6)

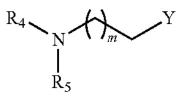

(6)

where $R_4$ and $R_5$ are independently a $C_1$-$C_4$ alkyl group or $R_4$ and $R_5$ together form a cyclic 5-membered or 6-membered ring containing an O or a N heteroatom or a 7-membered bicyclic structure, m is an integer 1 or 2 and Y is selected from —OH, —$NH_2$, $N(CH_3)CH_2CH_2OH$, $NHCH_2CH_2CH_2N(CH_3)_2$ $N(CH_3)CH_2CH_2CH_2NH_2$, $N(CH_2CH(CH_3)OH)_2$, $N(CH_2CH(CH_3)OH)CH_2CH_2CH_2N(CH_3)_2$ $OCH_2CH_2OH$, $OCH_2CH_2NH_2$, $OCH_2CH_2CH_2NH_2$, $OCH_2CH_2N(CH_3)CH_2CH_2OH$ and $OCH_2CH_2N(CH_3)CH_2CH_2CH_2NH_2$.

Examples of preferred reactive catalysts include, but are not limited to:

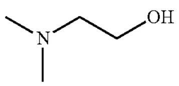

2-(dimethylamino)ethan-1-ol
JEFFCAT® DMEA

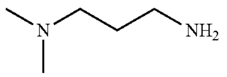

$N^1$,$N^1$-dimethylpropane-1,3-diamine
JEFFCAT® DMAPA

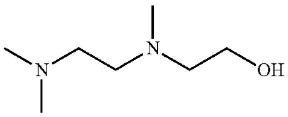

2-((2-(dimethylamino)ethyl)(methyl)amino)ethan-1-ol
JEFFCAT® Z-110

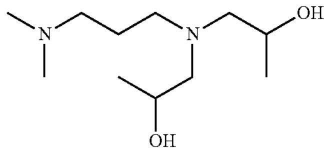

1,1′-((3-(dimethylamino)propyl)azanediyl)bis(propan-2-ol)
JEFFCAT® DPA

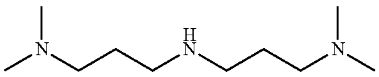

$N^1$-(3-(dimethylamino)propyl)-$N^3$,$N^3$-dimethylpropane-1,3-diamine
JEFFCAT® Z-130

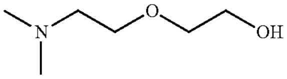

2-(2-(dimethylamino)ethyoxy)ethan-1-ol
JEFFCAT® ZR-70

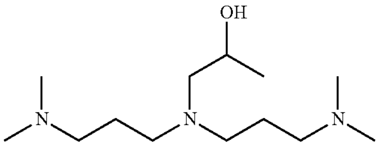

1-(bis(3-(dimethylamino)propyl)amino)propan-2-ol
JEFFCAT® ZR-50

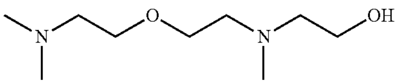

2-((2-(2-(dimethylamino)ethyoxy)ethyl)(methyl)amino)ethan-1-ol
JEFFCAT® ZF-10

-continued

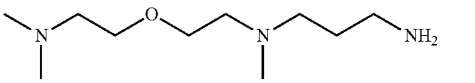

$N^1$-(2-(2-(dimethylamino)ethyoxy)ethyl)-$N^1$-methylpropane-1,3-diamine

Examples of preferred cyclic and bicyclic build-in catalysts include, but are not limited to

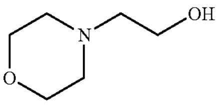

2-morpholinoethan-1-ol

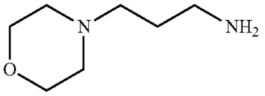

3-morpholinopropan-1-amine

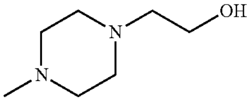

2-(4-methylpiperazin-1-yl)ethan-1-ol

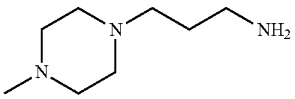

3-(4-methylpiperazin-1-yl)propan-1-amine

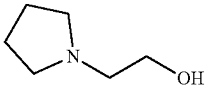

2-(pyrrolidin-1-yl)ethan-1-ol

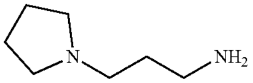

3-(pyrrolidin-1-yl)propan-1-amine

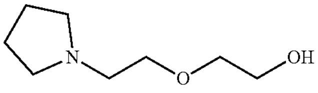

2-(2-(pyrrolidin-1-yl)ethoxy)ethan-1-ol

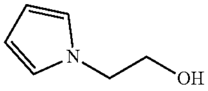

2-(1H-pyrrol-1-yl)ethan-1-ol

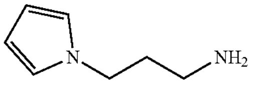

3-(1H-pyrrol-1-yl)propan-1-amine

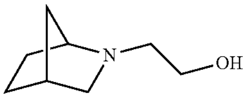

2-((1S,4R)-2-azabicyclo[2.2.1]heptan-2-yl)ethan-1-ol

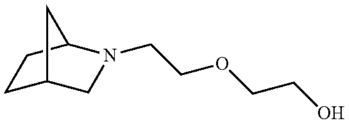

2-(2-((1S,4R)-2-azabicyclo[2.2.1]heptan-2-yl)ethoxy)ethan-1-ol

In still another embodiment, the reactive amine catalyst is a compound having the formula:

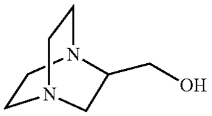

(($1^S$,$4^S$)-1,4-diazabicyclo[2.2.2]octan -2-yl)methanol.

According to further embodiments, the sulfonic acid esters above may also be combined with non-reactive catalysts. Representative non-reactive catalysts include, but are not limited to, bis-(2-dimethylaminoethyl)ether (JEFFCAT® ZF-20 catalyst), bis-(N,N-dimethylaminoethoxyethyl)methylamine (JEFFCAT® LE-30 catalyst), N,N-dimethylcyclohexylamine (JEFFCAT® DMCHA catalyst), benzyldimethylamine (JEFFCAT® BDMA catalyst), pentamethyldiethylenetriamine (JEFFCAT® PMDETA catalyst), N,N,N',N",N"-pentamethyldipropylenetriamine (JEFFCAT® ZR-40 catalyst) triethylene diamine (JEFFCAT® TEDA catalyst), N-ethylmorpholine (JEFFCAT® NEM catalyst), N-methylmorpholine (JEFFCAT® NMM catalyst), N,N'dimethylpiperzine (JEFFCAT® DMP catalyst), 2,2'-dimorpholinodiethylether (JEFFCAT® DMDEE catalyst), 1,3,5-tris(3-(dimethylamino)propyl)-hexahydro-s-triazine (JEFFCAT® TR-90 catalyst), wherein JEFFCAT is a registered trademark of Huntsman Corporation or an affiliate thereof. Other non-reactive catalysts which may be used in the present disclosure may be found in Appendix D in "Dow Polyurethanes Flexible Foams" by Herrington et al. at pages D.1-D.23 (1997), which is incorporated herein by reference. Further examples may be found in "JEFFCAT® Amine Catalysts for the Polyurethane Industry" version JCT-0910 which is incorporated herein by reference.

According to another embodiment, the polyurethane formulation may include a non-amine catalyst. A non-amine catalyst is a compound having catalytic activity for the reaction of an isocyanate group with an active hydrogen-containing compound or water, but is not a compound falling within the description of the isocyanate reactive amine catalyst above. Examples of such additional non-amine catalysts include, for example:

- tertiary phosphines, such as trialkylphosphines and dialkylbenzylphosphines;
- chelates of various metals, such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni;
- metal carboxylates such as potassium acetate and sodium acetate;
- acidic metal salts of strong acids, such as ferric chloride, stannic chloride, stannous chloride, antimony trichloride, bismuth nitrate and bismuth chloride;
- strong bases, such as alkali and alkaline earth metal hydroxides, alkoxides and phenoxides;
- alcoholates and phenolates of various metals, such as $Ti(OR_6)_4$, $Sn(OR_6)_4$ and $Al(OR_6)_3$ where $R_6$ is alkyl or aryl, and the reaction products of the alcoholates with carboxylic acids, beta-diketones and 2-(N,N-dialkylamino) alcohols;
- alkaline earth metal, Bi, Pb, Sn or Al carboxylate salts; and tetravalent tin compounds, and tri- or pentavalent bismuth, antimony or arsenic compounds.

The reactive amine catalyst and optional non-reactive catalyst and non-amine catalyst may be used in a catalytically effective amount to catalyze the reaction between a compound containing an isocyanate functional group and an active hydrogen-containing compound for making rigid, semi-rigid or flexible polyurethane foam or other polyurethane materials. A catalytically effective amount of the catalysts above (i.e., the amine catalyst and, optionally, the non-reactive and/or non-amine catalysts) may range from about 0.01-15 parts per 100 parts of active hydrogen-containing compound, and in some embodiments from about 0.05-12.5 parts per 100 parts of active hydrogen-containing compound, and in even further embodiments from about 0.1-7.5 parts per 100 parts of active hydrogen-containing compound, and yet in even further embodiments from about 0.5-5 parts per 100 parts of active hydrogen-containing compound. In one particular embodiment, the amount of the catalyst may range from about 0.1-3 parts per 100 parts of active hydrogen-containing compound.

In one embodiment, the compound containing an isocyanate functional group is a polyisocyanate and/or an isocyanate-terminated prepolymer.

Polyisocyanates include those represented by the general formula $Q(NCO)_a$ where a is a number from 2-5, such as 2-3 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms.

Examples of polyisocyanates include, but are not limited to, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; isophorone diisocyanate; 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenylmethane-2,4'- and/or −4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI); norbornane diisocyanates; m- and p-isocyanatophenyl sulfonylisocyanates; perchlorinated aryl polyisocyanates; modified polyisocyanates containing carbodiimide groups, urethane groups, allophnate groups, isocyanurate groups, urea groups, or biruret groups; polyisocyanates obtained by telomerization reactions; polyisocyanates containing ester groups; and polyisocyanates containing polymeric fatty acid groups. Those skilled in the art will recognize that it is also possible to use mixtures of the polyisocyanates described above.

Isocyanate-terminated prepolymers may also be employed in the preparation of the polyurethane material. Isocyanate-terminated prepolymers may be prepared by reacting an excess of polyisocyanate or mixture thereof with a minor amount of an active-hydrogen containing compound as determined by the well-known Zerewitinoff test.

In another embodiment, the active hydrogen-containing compound is a polyol. Polyols suitable for use in the present disclosure include, but are not limited to, polyalkylene ether polyols, polyester polyols, polymer polyols, a non-flammable polyol such as a phosphorus-containing polyol or a halogen-containing polyol. Such polyols may be used alone or in suitable combination as a mixture.

Polyalkylene ether polyols include poly(alkylene oxide) polymers, such as poly(ethylene oxide) and polypropylene oxide) polymers, and copolymers with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and similar low molecular weight polyols.

Polyester polyols include, but are not limited to, those produced by reacting a dicarboxylic acid with an excess of a diol, for example, adipic acid with ethylene glycol or butanediol, or reaction of a lactone with an excess of a diol such as caprolactone with propylene glycol.

In addition to polyalkylene ether polyols and polyester polyols, polymer polyols are also suitable for use in the present disclosure. Polymer polyols are used in polyurethane materials to increase resistance to deformation, for example, to improve the load-bearing properties of the foam or material. Examples of polymer polyols include, but are not limited to, graft polyols or polyurea modified polyols (Polyharnstoff Dispersion polyols). Graft polyols comprise a triol in which vinyl monomers are graft copolymerized. Suitable vinyl monomers include, for example, styrene, or acrylonitrile. A polyurea modified polyol is a polyol containing a polyurea dispersion formed by the reaction of a diamine and a diisocyanate in the presence of a polyol. A variant of polyurea modified polyols are polyisocyanate polyaddition (PIPA) polyols, which are formed by the in situ reaction of an isocyanate and an alkanolamine in a polyol.

The non-flammable polyol may, for example, be a phosphorus-containing polyol obtainable by adding an alkylene oxide to a phosphoric acid compound. A halogen-containing polyol may, for example, be those obtainable by ring-opening polymerization of epichlorohydrin or trichlorobutylene oxide.

The polyurethane formulation may also contain one or more halogenated olefin compounds that serve as a blowing agent. The halogenated olefin compound comprises at least one haloalkene (e.g., fluoroalkene or chlorofluoroalkene) comprising from 3 to 4 carbon atoms and at least one carbon-carbon double bond. Suitable compounds may include hydrohaloolefins such as trifluoropropenes, tetrafluoropropenes (e.g., tetrafluoropropene (1234)), pentafluoropropenes (e.g., pentafluoropropene (1225)), chlorotrifloropropenes (e.g., chlorotrifloropropene (1233)), chlorodifluoropropenes, chlorotrifluoropropenes, chlorotetrafluoropropenes, hexafluorobutenes (e.g., hexafluorobutene (1336)), or combinations thereof. In certain embodiments, the tetrafluoropropene, pentafluoropropene, and/or chlorotrifloropropene compounds have no more than one fluorine or chlorine substituent connected to the terminal carbon atom of the unsaturated carbon chain (e.g., 1,3,3,3-tetrafluoropropene (1234ze); 1,1,3,3-tetrafluoropropene, 1,2,3,3,3-pentafluoropropene (1225ye), 1,1,1-trifluoropropene, 1,2,3,3,3-pentafluoropropene, 1,1,1,3,3-pentafluoropropene (1225zc), 1,1,2,3,3-pentafluoropropene (1225yc), (Z)-1,1,1,2,3-pentafluoropropene (1225yez), 1-chloro-3,3,3-trifluoropropene (1233zd), 1,1,1,4,4,4-hexafluorobut-2-ene (1336mzzm), or combinations thereof).

Other blowing agents that may be used alone or in combination with the halogenated olefin compounds described above include air, nitrogen, carbon dioxide, hydrofluorocarbons ("HFCs"), alkanes, alkenes, mono-carboxylic acid salts, ketones, ethers, or combinations thereof. Suitable HFCs include 1,1-difluoroethane (HFC-152a), 1,1,1,2-tetrafluoroethane (HFC-134a), pentafluoroethane (HFC- 125), 1,1,1,3,3-pentafluoropropane (HFC-245fa), 1,1,1,3,3-pentaflurobutane (HFC-365mfc) or combinations thereof. Suitable alkanes and alkenes include n-butane, n-pentane, isopentane, cyclopentane, 1-pentene, or combinations thereof. Suitable mono-carboxylic acid salts include methyl formate, ethyl formate, methyl acetate, or combinations thereof. Suitable ketones and ethers include acetone, dimethyl ether, or combinations thereof.

In addition, the polyurethane formulation may optionally include one or more auxiliary components. Examples of auxiliary components include, but are not limited to, cell stabilizers, surfactants, chain extenders, pigments, fillers, flame retardants, thermally expandable microspheres, water, thickening agents, smoke suppressants, reinforcements, antioxidants, UV stabilizers, antistatic agents, infrared radiation absorbers, dyes, mold release agents, antifungal agents, biocides or any combination thereof.

Cell stabilizers may include, for example, silicon surfactants or anionic surfactants. Examples of suitable silicon surfactants include, but are not limited to, polyalkylsiloxane, polyoxyalkylene polyol-modified dimethylpolysiloxane, alkylene glycol-modified dimethylpolysiloxane, or any combination thereof.

Suitable surfactants (or surface-active agents) include emulsifiers and foam stabilizers, such as silicone surfactants known in the art, for example, polysiloxanes, as well as various amine salts of fatty acids, such as diethylamine oleate or diethanolamine stearate, as well as sodium salts of ricinoleic acids.

Examples of chain extenders include, but are not limited to, compounds having hydroxyl or amino functional groups, such as glycols, amines, diols, and water. Further non-limiting examples of chain extenders include ethylene glycol, propylene glycol, 1,4-butanediol, 1,3-butanediol, 1,5-pentanediol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclo-hexanol, 1,2-diaminoethane, or any mixture thereof.

Pigments may be used to color code the polyurethane materials during manufacture, to identify product grade, or to conceal yellowing. Pigments may include any suitable organic or inorganic pigments. For example, organic pigments or colorants include, but are not limited to, azo/diazo dyes, phthalocyanines, dioxazines, or carbon black. Examples of inorganic pigments include, but are not limited to, titanium dioxide, iron oxides or chromium oxide.

Fillers may be used to increase the density and load bearing properties of the polyurethane foam or material. Suitable fillers include, but are not limited to, barium sulfate, carbon black or calcium carbonate.

Flame retardants can be used to reduce flammability. For example, such flame retardants include, but are not limited to, chlorinated phosphate esters, chlorinated paraffins or melamine powders.

Thermally expandable microspheres include those containing a (cyclo)aliphatic hydrocarbon. Such microspheres are generally dry, unexpanded or partially unexpanded microspheres consisting of small spherical particles with an average diameter of typically 10 to 15 micron. The sphere is formed of a gas proof polymeric shell (e.g. consisting of acrylonitrile or PVDC), encapsulating a minute drop of a (cyclo)aliphatic hydrocarbon, e.g. liquid isobutane. When these microspheres are subjected to heat at an elevated temperature level (e.g. 150° C. to 200° C.) sufficient to soften the thermoplastic shell and to volatilize the (cyclo) aliphatic hydrocarbon encapsulated therein, the resultant gas expands the shell and increases the volume of the microspheres. When expanded, the microspheres have a diameter 3.5 to 4 times their original diameter as a consequence of which their expanded volume is about 50 to 60 times greater than their initial volume in the unexpanded state. Examples of such microspheres are the EXPANCEL®-DU microspheres which are marketed by AKZO Nobel Industries of Sweden.

The methods for producing a polyurethane material from a polyurethane formulation according to the present disclosure are well known to those skilled in the art and can be found in, for example, U.S. Pat. Nos. 5,420,170, 5,648,447, 6,107,359, 6,552,100, 6,737,471 and 6,790,872, the contents of which are hereby incorporated by reference. Various types of polyurethane materials can be made, such as rigid foams, flexible foams, semi-rigid foams, integral foams, microcellular elastomers, cast elastomeric foams, polyurethane-isocyanurate foams, reaction injection molded polymers, structural reaction injection molded polymers and the like.

According to one embodiment, the polyurethane material according to the present disclosure is a flexible polyurethane foam having a compressive stress at 10% compression or compressive strength according to DIN 53 421/DIN EN ISO 604 of 15 kPa and less, preferably 1 to 14 kPa and in particular 4 to 14 kPa.

According to another embodiment, the polyurethane material according to the present disclosure is a semi-rigid polyurethane foam having a compressive stress at 10% compression according to DIN 53 421/DIN EN ISO 604 of greater than 15 kPa to less than 80 kPa. According to DIN ISO 4590, semi-rigid polyurethane foams and flexible polyurethane foams according to the present disclosure may have an open cell of preferably greater than 85%, particularly preferably greater than 90%.

According to another embodiment, the polyurethane material according to the present disclosure is a rigid polyurethane foam having a compressive stress at 10% compression of greater than or equal to 80 kPa, preferably greater than or equal to 120 kPa, particularly preferably greater than or equal to 150 kPa. Furthermore, the rigid polyurethane foam according to DIN ISO 4590 has a closed cell of greater than 80%, preferably greater than 90%.

In another embodiment, the polyurethane material is an elastomeric polyurethane foam which is understood to mean a polyurethane foam in accordance with DIN 7726 which, after brief deformation by 50% of the thickness in accordance with DIN 53 577, have no permanent deformation over 2% of their original thickness after 10 minutes. These can be a rigid polyurethane foam, a semi-rigid polyurethane foam or a flexible polyurethane.

In a further embodiment, the polyurethane material according to the present disclosure is an integral polyurethane foam according to DIN 7726 with an edge zone which, due to the molding process, have a higher density than the core. The total bulk density averaged over the core and the peripheral zone is preferably above 100 g L. Integral polyurethane foams in the sense of this disclosure can also be rigid polyurethane foams, semi-rigid polyurethane foams or flexible polyurethane foams.

In one embodiment, the polyurethane material according to the present disclosure is a polyurethane foam with an average density of 20 g/L to 850 g/L, preferably a polyurethane rigid foam or a flexible polyurethane foam or a rigid polyurethane foam, particularly preferably an elastomeric flexible polyurethane foam, a rigid polyurethane foam or an elastomeric integral polyurethane foam.

In one particular embodiment, the polyurethane material according to the invention is a polyurethane foam with an average density of 20 to 850 g/L, preferably a semi-rigid polyurethane foam or a flexible polyurethane foam, particularly preferable an elastomeric flexible polyurethane foam, a semi-rigid polyurethane foam or an elastomeric integral polyurethane foam.

The elastomeric integral polyurethane foam preferably has a density of 150 g/L to 500 g/L averaged over the core and the edge zone. The flexible polyurethane foam preferably has an average density of 10 g/L to 100 g/L. The semi-rigid polyurethane foam preferably has an average density of 70 g/L to 150 g/L.

In a further embodiment, the polyurethane foam according to the present disclosure is a solid polyurethane with a density of preferably more than 850 g/L, preferably 900 g/L to 1400 g/L and particularly preferably 1000 g/L to 1300 g/L. A solid polyurethane is obtained essentially without the addition of a blowing agent. A small amount of blowing agent, for example water, which is contained in the polyols for production reasons, is not considered a blowing agent. The polyurethane formulation for producing the compact polyurethane foam preferably contains less than 0.2% by weight, particularly preferably less than 0.1% by weight and in particular less than 0.05% by weight of water.

A non-limiting example of a general flexible polyurethane foam formulation having a 15-150 kg/$m^3$ density (e.g. automotive seating) containing the sulfonic acid ester may comprise the following components in parts by weight (pbw):

| Flexible Foam Formulation | pbw |
|---|---|
| Polyol | 20-100 |
| Surfactant | 0.3-3 |
| Water | 1-6 |
| Crosslinker | 0-3 |
| isocyanate reactive amine catalyst comprising tertiary amine groups | 0.2-2.5 |
| Sulfonic acid ester | 0.25-2 |
| Isocyanate Index | 70-115 |

A non-limiting example of a general rigid polyurethane foam formulation having a 15-70 kg/$m^3$ density containing the sulfonic acid ester may comprise the following components in parts by weight (pbw):

| Rigid Foam Formulation | Pbw |
|---|---|
| Polyol | 100 |
| Surfactant | 1-3 |
| Blowing Agent | 20-40 |
| Water | 0-3 |
| isocyanate reactive amine catalyst comprising tertiary amine groups | 0.5-3 |
| Sulfonic acid ester | 0.25-2 |
| Isocyanate Index | 80-400 |

The amount of the compound containing an isocyanate functional group is not limited, but will generally be within those ranges known to one skilled in the art. An exemplary range given above is indicated by reference to Isocyanate Index which is defined as the number of equivalents of isocyanate divided by the total number of equivalents of active hydrogen, multiplied by 100.

Thus, in yet another embodiment, the present disclosure provides a method for producing a polyurethane material which comprises combining and/or reacting (in any order) the compound containing an isocyanate functional group, an active hydrogen-containing compound, sulfonic acid ester according to the present disclosure and optional auxiliary components in the presence of the build-in amine catalyst.

According to an embodiment, the sulfonic acid ester compound is pre-mixed with the compound containing an isocyanate functional group before combining and reacting with the active hydrogen-containing compound, the isocyanate reactive amine catalyst and optional auxiliary components.

In one particular embodiment, the polyurethane material is a rigid, semi-rigid or flexible foam prepared by bringing together at least one polyol and at least one polyisocyanate in the presence of the reactive amine catalyst and sulfonic acid ester to form a reaction mixture and subjecting the reaction mixture to conditions sufficient to cause the polyol to react with the polyisocyanate. The polyol, polyisocyanate, reactive catalyst and sulfonic acid ester may be heated prior to mixing them and forming the reaction mixture. In other embodiments, the polyol, polyisocyanate, isocyanate reactive amine catalyst comprising tertiary amine groups (also referred to as "build-in" amine catalyst) and sulfonic acid ester are mixed at ambient temperature (for e.g. from about 15° C.-40° C.) and heat may be applied to the reaction mixture, but in some embodiments, applying heat may not be necessary. The polyurethane foam may be made in a free rise (slabstock) process in which the foam is free to rise under minimal or no vertical constraints. Alternatively, molded foam may be made by introducing the reaction mixture in a closed mold and allowing it to foam within the mold. The particular polyol and polyisocyanate are selected with the desired characteristics of the resulting foam. Other auxiliary components useful in making polyurethane foams, such as those described above, may also be included to produce a particular type of foam.

The polyurethane materials produced may be used in a variety of applications including, but not limited to, in vehicle interior and exterior parts of means of transport such as ships, airplanes, trucks, cars or buses, particularly preferably cars or buses and in particular cars. The interior of cars and buses is referred to below as the automotive interior part. A flexible polyurethane foam can be used as a seat cushion, a semi-rigid polyurethane foam as back-foaming of door side elements or instrument panels, an integral polyurethane foam as a steering wheel, shift button. The polyurethane foam may also be used in bed liners, dashboards, door panels. In other embodiments, the polyurethane foam may be used as: a precoat; a backing material for carpet; building composites; insulation; spray foam insulation; applications requiring use of impingement mix spray guns; urethane/urea hybrid elastomers; integral skin foams; rigid spray foams; rigid pour-in-place foams; coatings; adhesives; sealants; filament winding; and other polyurethane composite, foams, elastomers, resins, and reaction injection molding (RIM) applications.

The present disclosure will now be further described with reference to the following non-limiting examples.

EXAMPLES

Examples 1-4

Polyurethane foams were formulated as in Table 1 below wherein the components can be described as follows:

Examples 1-5

Polyurethane foams were formulated as in Table 1 below wherein the components can be described as follows:

TABLE 1

| Composition | REF 1 | Comparative example 1 | Example 1 | Example 2 | Example 3 | Example 4 | REF2 | Example 5 |
|---|---|---|---|---|---|---|---|---|
| Base polyol, 6000 MW, 3fn, Ohv 28 mg KOH/g | 92 | 92 | 92 | 92 | 92 | 92 | 92 | 92 |
| Cell opener polyol, 1500 MW, 2fn, Ohv 125 mg KOH/g | 2.5 | 2.5 | 2.5 | 2.5 | 2.5 | 2.5 | 2.5 | 2.5 |
| Silicone surfactant-Dow silicone | 0.9 | 0.9 | 0.9 | 0.9 | 0.9 | 0.9 | 0.9 | 0.9 |
| Diethanolamine OHV 1078 mg KOH/g | 0.25 | 0.25 | 0.25 | 0.25 | 0.25 | 0.25 | 0.25 | 0.25 |
| Water | 3.2 | 3.2 | 3.2 | 3.2 | 3.2 | 3.2 | 3.2 | 3.2 |
| Low emission iso-reactive tert. amine blow catalyst | 0.1 | 0.1 | 0.1 | 0.1 | 0.1 | 0.1 | 0.1 | 0.1 |
| Low emission iso-reactive tert. amine gel catalyst | 0.9 | 0.9 | 0.9 | 0.9 | 0.9 | 0.9 | 0.9 | 0.9 |
| mmol tertiary amine catalyst | 9.3 | 9.3 | 9.3 | 9.3 | 9.3 | 9.3 | 9.3 | 9.3 |
| Chlorohexanol | | 0.55 | | | | | | |
| 4 methyl toluene sulfonate | | | 0.75 | | | | | |
| 4 ethyl toluene sulfonate | | | | 0.8 | | | | |
| Methyl benzene sulfonate | | | | | 0.7 | | | |
| Ethylene di(p-toluene sulfonate) | | | | | | 1.5 | | |
| Diethyleneglycol monosulfonate | | | | | | | | 1 |
| mmol additive | | | 4 | 4 | 4 | 4 | | 4 |
| Molar ratio tert amine/additive (*) | N/A | N/A | 2.3 | 2.3 | 2.3 | 2.3 | N/A | 2.3 |

(*) The molar ratio of the number of moles of tertiary amine groups present in isocyanatereactive amine catalysts over the number of moles of sulfonic acid ester compounds in the formulation.
OHv is the OH value, Fn is functionality.

The polyurethane foams were prepared according to the following procedure:

The polyol blend (which includes the polyether polyols having a functionality between 2 and 6, water as a blowing agent, silicone surfactant, crosslinker and catalysts) is first pre-mixed with the sulfonic acid ester according to the present disclosure for 30 seconds at low speed (500 rpm) in a carton cup of 800 ml.

Afterwards, the MDI was added, and the resultant polyurethane formulation was mixed at high speed (2000 rpm) for 5 seconds. The polyurethane formulation was then poured into the pre-heated (50° C.) mold. Inner dimensions of the mold were 25×25×10 cm. The goal was to create a polyurethane foam with a density of about 55 g/L. After 5 minutes the polyurethane foam was taken out, weighed and manually crushed before being put away to cure for at least 72 hours at normal conditions (23° C.±2° C. and 50±5% relative humidity).

The polyurethane foams were further tested under humid aged compression set as following: after 72 hours the foam was cut into pieces that had parallel top and bottom surfaces and essentially vertical sides. Dimensions were (50±1) mm in length, (50±1) mm wide and (25±1) mm thick. The samples underwent an accelerated humid aging (ISO 2440). This was done in an autoclave at (120±2°) C. and 100% relative humidity for 5 hours. After aging, the samples were put in an oven at (70±2°) C. for 3 hours to dry. After drying, the samples were reconditioned under normal conditions (23° C.±2° C. & 50±5% relative humidity) for at least 3 hours. Samples underwent this accelerated aging three times before they underwent the compression set.

After the samples had conditioned (23° C.±2° C. & 50±5% relative humidity), the initial thickness ($d_0$) was measured in accordance with ISO 1923. The test pieces were placed between the plates of a compression device and compressed by (50±4)% of their thickness and maintained under this condition. Within 15 minutes the compressed samples were then put into an oven at (70±1°) C. for (22±0.2) hours. After 22 hours the apparatus was taken out of the oven and within 1 min the samples were removed and placed on a surface of low thermal conductivity, under normal conditions. The test pieces were allowed to recover for (30±5) minutes under normal conditions after which the thickness ($d_r$) was re-measured. The compression set was calculated by:

$$c.s = \frac{d_0 - d_r}{d_0} \times 100$$

The results are summarized below in Table 2.

TABLE 2

| Composition | REF 1 | Comparative example 1 | Example 1 | Comparative example 2 | Example 3 | Example 4 | REF2 | Example 5 |
|---|---|---|---|---|---|---|---|---|
| Compression set | | | | | | | | |
| CS core dry initial (% change) | 7.7 | 9.5 | 5.5 | 6.6 | 5.2 | 7.1 | 8 | 7.2 |
| HACS after 3 ageing cycles (% change) | 37.4 | 30.9 | 28.8 | 31.7 | 25.7 | 30.9 | 36 | 25.4 |
| VDA-278 total desorption analysis | | | | | | | | |
| VOC (ppm) | 56.7 | 41.2 | 34.9 | 827.2 | 33 | 43.2 | 72 | 77 |
| FOG (ppm) | 28.4 | 34.7 | 25 | 294.9 | 23.4 | 59.4 | 166 | 186 |

The comparative antiaging additive showed a compression set after ageing of 30.9% height loss. The polyurethane foams for Examples 1, 3, 4 and 5 according to the invention showed a further improvement in either the dry compression set and/or dry and humid aged compression set.

The polyurethane foams above were also analyzed for emissions. This step was done using the VDA-278 method. The VDA-278 (Verbund Deutsche Automobil) test method is a thermal desorption test of a plastic (polyurethane foam) whereby a piece of the polyurethane foam is first exposed to 90° C. for 30 minutes after which the same foam is further heated to 120° C. and maintained at this temperature for 60 min. All volatile organic components (VOC) were collected and analyzed via GC-MS. The results are summarized in Table 2. The examples according to the invention showed both good physical properties in combination with low emission values.

While the foregoing is directed to various embodiment s of the present disclosure, other and further embodiments of the disclosure may be devised without departing from the basic scope thereof, and the scope thereof is determined by the claims that follow.

Examples 6-7 and Comparative Examples 8-10

Polyurethane foams were formulated as in Table 3 below wherein the components can be described as follows:

TABLE 3

| Composition | REF 3 | Example 6 | Example 7 | Comparative example 8 | Comparative example 9 | Comparative example 10 |
|---|---|---|---|---|---|---|
| Base polyol, 6000 MW, 3fn, Ohv 28 mg KOH/g | 92 | 92 | 92 | 92 | 92 | 92 |
| Cell opener polyol, 1500 MW, 2fn, Ohv 125 mg KOH/g | 2.5 | 2.5 | 2.5 | 2.5 | 2.5 | 2.5 |
| Silicone surfactant-Dow silicone | 0.9 | 0.9 | 0.9 | 0.9 | 0.9 | 0.9 |
| Diethanolamine OHV 1078 mg KOH/g | 0.25 | 0.25 | 0.25 | 0.25 | 0.25 | 0.25 |
| Water | 3.2 | 3.2 | 3.2 | 3.2 | 3.2 | 3.2 |
| Low emission iso-reactive tert. amine blow catalyst | 0.1 | 0.1 | 0.1 | 0.1 | 0.1 | 0.1 |
| Low emission iso-reactive tert. amine gel catalyst | 0.9 | 0.9 | 0.9 | 0.9 | 0.9 | 0.9 |
| mmol tertiary amine catalysts | | | | 9.3 | | |
| 4 methyl toluene sulfonate | | 0.5 | 0.75 | 1 | | |
| 4 chloro ethyl toluene sulfonate | | | | | 0.5 | 1 |
| mmol additive | | 2.7 | 4 | 5.5 | 2.1 | 4.5 |
| Molar ratio tert amine/additive (*) | N/A | 3.44 | 2.32 | 1.7 | 4.4 | 2.1 |
| Physical properties | | | | | | |
| | | Compression set | | | | |
| CS core dry initial (% change) | 8 | 6.8 | 6.3 | 6.3 | 7.6 | 7.8 |
| HACS after 3 ageing cycles (% change) | 36 | 31.6 | 28.5 | 18.6 | 28.4 | 20.4 |
| | VDA-278 total desorption analysis | | | | | |
| VOC (ppm) | 60 | 31 | 23 | 292 | 165 | 439 |
| FOG (ppm) | 76 | 12 | 83 | 13 | 656 | 893 |

(*) The molar ratio of the number of moles of tertiary amine groups present in isocyanatereactive amine catalysts over the number of moles of sulfonic acid ester compounds in the formulation.

The polyurethane foams in Table 3 were prepared according to the procedure used for examples 1-5 above.

The examples 6 and 7 according to the invention showed both good physical properties in combination with low emission values. The comparative examples 8, 9 and 10 did not have good emission values.

Examples 11-12 and Comparative Example 13

Polyurethane foams were formulated as in Table 4 below wherein the components can be described as follows:

TABLE 4

| | REF 4 | Example 11 | Example 12 | Comparative example 13 |
|---|---|---|---|---|
| Composition | | | | |
| Base polyol, 6000 MW, 3fn, 0hv 28 mg KOH/g | 92 | 92 | 92 | 92 |
| Cell opener polyol, 1500 MW, 2fn, 0hv 125 mg KOH/g | 2.5 | 2.5 | 2.5 | 2.5 |
| Silicone surfactant - Dow silicone | 0.9 | 0.9 | 0.9 | 0.9 |
| Diethanolamine 0HV 1078 mg KOH/g | 0.25 | 0.25 | 0.25 | 0.25 |
| Water | 3.2 | 3.2 | 3.2 | 3.2 |
| Low emission iso-reactive tertiary amine blow catalyst | 0.1 | 0.1 | 0.1 | 0.1 |
| Low emission iso- reactive tertiary amine gel catalyst | 0.9 | 0.9 | 0.9 | 0.9 |
| mmol tertiary amine catalysts | | | 9.3 | |

TABLE 4-continued

| | REF 4 | Example 11 | Example 12 | Comparative example 13 |
|---|---|---|---|---|
| 4 methyl benzene sulfonate | | 0.4 | 0.7 | 1 |
| mmol additive | | 2.5 | 4 | 6 |
| Molar ratio tert amine/additive (*) | N/A | 3.7 | 2.3 | 1.55 |
| Physical properties | | | | |
| Compression set | | | | |
| CS core dry initial (% change) | 8 | 6.6 | 5.4 | 6 |
| HACS after 3 ageing cycles (% change) | 36 | 34.1 | 28.8 | 22.5 |
| VDA-278 total desorption analysis | | | | |
| VOC (ppm) | 72 | 59 | 47 | 623 |
| FOG (ppm) | 168 | 180 | 137 | 184 |

(*) The molar ratio of the number of moles of tertiary amine groups present in isocyanate reactive amine catalysts over the number of moles of sulfonic acid ester compounds in the formulation.

The polyurethane foams in Table 4 were prepared according to the procedure used for examples 1-5 above.

The examples 11 and 12 according to the invention showed both good physical properties in combination with low emission values. The comparative example 13 did not have good emission values.

What is claimed is:

1. A polyurethane formulation comprising: (a) a sulfonic acid ester selected from (i) a compound having a formula (1)

(1)

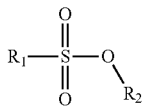

where $R_1$ is a $C_1$-$C_{18}$ alkyl group with one or more hydroxyl groups or a $C_1$-$C_{18}$ alkoxy group with one or more hydroxyl groups and $R_2$ is a methyl group, a $C_1$-$C_{18}$ alkyl group with one or more hydroxyl groups or a $C_1$-$C_{18}$ alkoxy group with one or more hydroxyl groups; (ii) a compound having a formula (2)

(2)

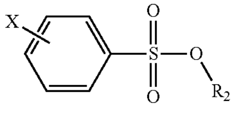

where X is hydrogen or an ortho, meta or para substituent selected from a $C_1$-$C_{18}$ alkyl group which may be substituted with one or more hydroxyl groups or a $C_1$-$C_{18}$ alkoxy group which may be substituted with one or more hydroxyl groups and $R_2$ is a methyl group, a $C_1$-$C_{18}$ alkyl group with one or more hydroxyl groups or $C_1$-$C_{18}$ alkoxy group with one or more hydroxyl groups; (iii) a compound having the formula (3)

(3)

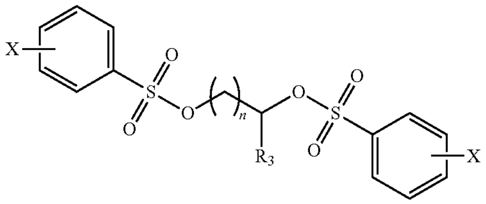

where each X is independently hydrogen or an ortho, meta or para substituent selected from a $C_1$-$C_{18}$ alkyl group which may be substituted with one or more hydroxyl groups or $C_1$-$C_{18}$ alkoxy group which may be substituted with one or more hydroxyl groups, n is an integer from 1 to 8 and $R_3$ is H, a $C_1$-$C_4$ alkyl group which may be substituted with one or more hydroxyl groups or a or $C_1$-$C_4$ alkoxy group which may be substituted with one or more hydroxyl groups; (iv) a compound having a formula (4)

(4)

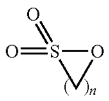

where n is an integer from 1 to 5; (v) a compound having the formula (5)

(5)

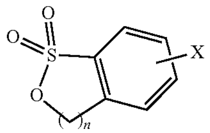

where n is an integer from 1 to 3 and X is hydrogen or an ortho, meta or para substituent selected from a $C_1$-$C_{18}$ alkyl group which may be substituted with one or more hydroxyl groups or $C_1$-$C_{18}$ alkoxy group which may be substituted with one or more hydroxyl groups; and (vi) a mixture thereof; (b) a compound containing an isocyanate functional group; (c) an active hydrogen-containing compound; and (d) an isocyanate-reactive amine catalyst comprising at least one tertiary amine group and corresponding to formula (6)

(6)

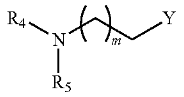

wherein $R_4$ and $R_5$ are independently a $C_1$-$C_4$ alkyl group or $R_4$ and $R_5$ together form a cyclic 5-membered or 6-membered ring containing an O or a N heteroatom or a 7-membered bicyclic structure, m is an integer 1 or 2, and Y is selected from —OH, —$NH_2$, —$N(CH_3)CH_2CH_2OH$, —$NHCH_2CH_2CH_2N(CH_3)_2$, —$N(CH_3)CH_2CH_2CH_2NH_2$, —$N(CH_2CH(CH_3)OH)_2$, —$N(CH_2CH(CH_3)OH)CH_2CH_2CH_2N(CH_3)_2$, —$OCH_2CH_2OH$, —$OCH_2CH_2NH_2$, —$OCH_2CH_2CH_2NH_2$, —$OCH_2CH_2N(CH_3)CH_2CH_2OH$, and —$OCH_2CH_2N(CH_3)CH_2CH_2CH_2NH_2$, and characterized in that the molar ratio of the total number of moles of the at least one tertiary amine group present in isocyanate-reactive amine catalyst (d) to the number of moles of sulfonic acid ester compound (a) in the polyurethane formulation is higher or equal than 2.

2. The polyurethane formulation of claim 1 wherein the molar ratio of the number of moles of the at least one tertiary amine group present in isocyanate-reactive amine catalyst (d) to the number of moles of sulfonic acid ester compound (a) in the polyurethane formulation is in the range 2-5.

3. The polyurethane formulation of claim 1, wherein the sulfonic acid ester is a compound having the formula (2) wherein $R_2$ is methyl.

4. The polyurethane formulation of claim 1, wherein X is a lower alkyl group selected from methyl, ethyl, n-propyl, i-propyl, butyl and pentyl groups which may be substituted with one or more hydroxyl groups.

5. The polyurethane formulation of claim 1, wherein X is hydrogen and $R_2$ is methyl.

6. The polyurethane formulation of claim 1, wherein the sulfonic acid ester is selected from methyl p-toluene sulfonate, methyl benzene sulfonate, ethylene bis(p-toluene sulfonate) and/or 2-(2-hydroxyethoxy)ethyl 4-methylbenzenesulfonate.

7. The polyurethane formulation of claim 1, wherein the sulfonic acid ester is a compound having the formula (3)

(3)

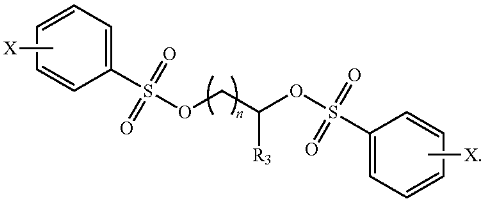

8. The polyurethane formulation of claim 7, wherein each X is independently a $C_1$-$C_4$ alkyl group which may be substituted with one or more hydroxyl groups or a $C_1$-$C_4$ alkoxy group which may be substituted with one or more hydroxyl groups.

9. The polyurethane formulation of claim 1, wherein the isocyanate-reactive amine catalyst is a compound having the formula

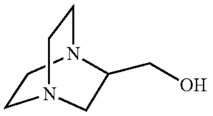

((1$^S$,4$^S$)-1,4-diazabicyclo[2.2.2]octan -2-yl)methanol.

10. The polyurethane formulation according to any of foregoing claims, further comprising a blowing agent.

11. A method for producing a polyurethane material comprising preparing a formulation by combining and/or reacting a compound containing an isocyanate functional group, an active hydrogen-containing compound and optional auxiliary components, in the presence of an isocyanate-reactive amine catalyst comprising at least one tertiary amine group according to formula (6)

(6)

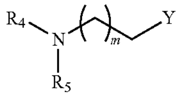

wherein $R_4$ and $R_5$ are independently a $C_1$-$C_4$ alkyl group or $R_4$ and $R_5$ together form a cyclic 5-membered or 6-membered ring containing an O or a N heteroatom or a 7-membered bicyclic structure, m is an integer 1 or 2, and Y is selected from —OH, —$NH_2$, —$N(CH_3)CH_2CH_2OH$, —$NHCH_2CH_2CH_2N(CH_3)_2$, —$N(CH_3)CH_2CH_2CH_2NH_2$, —$N(CH_2CH(CH_3)OH)_2$, —$N(CH_2CH(CH_3)OH)CH_2CH_2CH_2N(CH_3)_2$, —$OCH_2CH_2OH$, —$OCH_2CH_2NH_2$, —$OCH_2CH_2CH_2NH_2$, —$OCH_2CH_2N(CH_3)CH_2CH_2OH$, and —$OCH_2CH_2N(CH_3)CH_2CH_2CH_2NH_2$, and in the presence of a sulfonic acid ester selected from (i) a compound having a formula (1)

(1)

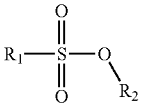

where $R_1$ is a $C_1$-$C_{18}$ alkyl group with one or more hydroxyl groups or a $C_1$-$C_{18}$ alkoxy group with one or more hydroxyl groups and $R_2$ is a methyl group, a $C_1$-$C_{18}$ alkyl group with one or more hydroxyl groups or a $C_1$-$C_{18}$ alkoxy group with one or more hydroxyl groups; (ii) a compound having a formula (2)

(2)

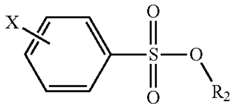

where X is hydrogen or an ortho, meta or para substituent selected from a $C_1$-$C_{18}$ alkyl group which may be substituted with one or more hydroxyl groups or a $C_1$-$C_{18}$ alkoxy group which may be substituted with one or more hydroxyl groups and $R_2$ is a methyl group, a $C_1$-$C_{18}$ alkyl group with one or more hydroxyl groups or a $C_1$-$C_{18}$ alkoxy group with one or more hydroxyl groups; (iii) a compound having the formula (3)

(3)

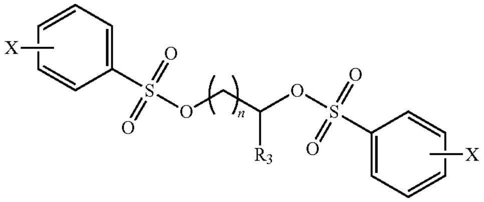

where each X is independently hydrogen or an ortho, meta or para substituent selected from a $C_1$-$C_{18}$ alkyl group which may be substituted with one or more hydroxyl groups or a $C_1$-$C_{18}$ alkoxy group which may be substituted with one or more hydroxyl groups, n is an integer from 1 to 8 and $R_3$ is H or a $C_1$-$C_4$ alkyl group or $C_1$-$C_4$ alkoxy group which may be substituted with one or more hydroxyl groups; (iv) a compound having a formula (4)

(4)

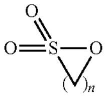

where n is an integer from 1 to 5; (v) a compound having the formula (5)

(5)

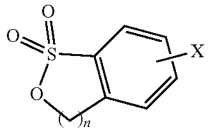

where n is an integer from 1 to 3 and X is hydrogen or an ortho, meta or para substituent selected from a $C_1$-$C_{18}$ alkyl which may be substituted with one or more hydroxyl groups or a $C_1$-$C_{18}$ alkoxy group which may be substituted with one or more hydroxyl groups; and (vi) a mixture thereof characterized in that the molar ratio of the number of moles of the at least one tertiary amine group present in isocyanate-reactive amine catalyst (d) to the number of moles of sulfonic acid ester compound (a) in the formulation is higher or equal than 2.

12. A polyurethane material produced according to the method of claim 11.

13. The polyurethane material of claim 12, wherein the polyurethane material is a rigid foam, a semi-rigid foam or a flexible foam.

14. A polyurethane foam produced with the polyurethane formulation of claim 1 which is suitable for use in a vehicle interior or exterior parts of ships, airplanes, trucks, cars or buses.

15. A polyurethane foam produced with the polyurethane formulation of claim 1 which is suitable for use in cars as a seat cushion, as back-foaming of a door side element, an instrument panel, as a steering wheel, a shift button, a bed liner, a dashboard or a door panel.

* * * * *